(12) United States Patent
Adam et al.

(10) Patent No.: US 10,749,395 B2
(45) Date of Patent: Aug. 18, 2020

(54) ASSEMBLY AND METHOD FOR PREVENTING AXIAL MIGRATION OF SPRINGS IN GENERATOR ROTORS

(71) Applicant: Siemens Energy, Inc., Orlando, FL (US)

(72) Inventors: Andrew Adam, Saint Charles, MO (US); Mark Roberts, Wentzville, MO (US); Grant Hennessey, Tega Cay, SC (US); Alan Fortner, Mint Hill, NC (US); Brent Mazingo, Charlotte, NC (US); Randy Edward Whitener, Oviedo, FL (US); Michael D. Garmon, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 197 days.

(21) Appl. No.: 15/957,029

(22) Filed: Apr. 19, 2018

(65) Prior Publication Data

US 2019/0326791 A1    Oct. 24, 2019

(51) Int. Cl.
| | | |
|---|---|---|
| *H02K 3/24* | (2006.01) | |
| *H02K 1/26* | (2006.01) | |
| *H02K 15/00* | (2006.01) | |
| *H02K 3/487* | (2006.01) | |
| *H02K 3/16* | (2006.01) | |

(52) U.S. Cl.
CPC .............. *H02K 3/24* (2013.01); *H02K 1/26* (2013.01); *H02K 3/16* (2013.01); *H02K 3/487* (2013.01); *H02K 15/0018* (2013.01)

(58) Field of Classification Search
CPC ............ H02K 3/487; H02K 3/24; H02K 3/16; H02K 1/26; H02K 15/0018

USPC .......................................................... 310/214
See application file for complete search history.

(56) References Cited

U.S. PATENT DOCUMENTS

| | | | | |
|---|---|---|---|---|
| 4,739,207 A | * | 4/1988 | Ying ....................... | H02K 3/16 310/214 |
| 2004/0263017 A1 | * | 12/2004 | De Lima ................ | H02K 3/487 310/214 |
| 2013/0021797 A1 | | 1/2013 | Kubo | |
| 2013/0221797 A1 | * | 8/2013 | Rigosu, Jr. .............. | H02K 3/16 310/261.1 |
| 2014/0232220 A1 | | 8/2014 | Srinivasan et al. | |
| 2016/0352177 A1 | * | 12/2016 | Adam ..................... | H02K 3/24 |

OTHER PUBLICATIONS

PCT International Search Report and Written Opinion dated Jul. 3, 2019 corresponding to PCT Application PCT/US2019/023499 filed Mar. 22, 2019.

* cited by examiner

*Primary Examiner* — Michael Andrews

(57) ABSTRACT

An assembly and a method for preventing an axial migration of a spring in a generator rotor are presented. The assembly includes a step pin radially disposed through an amortisseur and inserted into a spring of the generator rotor. The step pin is arranged axially apart from an adjacent radial vent passage and radially extends through the spring into a slot clearance between the spring and a creepage. The amortisseur includes a counter bore to retain a pin head and a pin shoulder. The spring includes a pin hole for a pin body extending therethrough. Diameters of the counter bore and the pin hole are smaller than diameters of amortisseur radial vent aperture and spring radial vent aperture. The step pin prevents an axial migration of the spring in rotor slots.

8 Claims, 3 Drawing Sheets

ASSEMBLY AND METHOD FOR PREVENTING AXIAL MIGRATION OF SPRINGS IN GENERATOR ROTORS

TECHNICAL FIELD

The present invention relates generally to an assembly and a method for preventing an axial migration of a spring in an electric machine, and more in particularly, for preventing an axial migration of a spring in a generator rotor.

DESCRIPTION OF RELATED ART

Generator is a component that converts mechanical power to electrical power in power generation industry. Generator typically includes a stator and a rotor each comprised of a plurality of electrical conductors, such as windings. A generator rotor has a plurality of axially extending rotor slots distributed around a circumference of the rotor. At least one rotor winding is placed in each of the rotor slots. Other components are also placed in each of the rotor slots, such as creepage, spring, amortisseur, etc. The rotor windings and other components may be stacked on top of each other within each of the rotor slots. A wedge is placed in each of the rotor slots to maintain the rotor windings and other components in the each of the rotor slots.

During generator operation, heat may be generated in the rotor windings. Rotor windings may be cooled by a coolant axially flowing into the rotor slots and radially vent out of the rotor through radial vent passages. The radial vent passages may be formed by a plurality of holes of the rotor windings, creepage, spring, amortisseur and wedge which are radially aligned. During generator operation, the springs in the rotor slots may migrate in an axial direction due to rotor cooling and heating cycles and other causes, which may block the radial vent passages. The blockage of radial vent passage may lead to issues of generator operation.

US 2013/0221797 disclosed a stop block abutting an end of the amortisseur to maintain radial venting hole alignment. US 2016/0352177 disclosed a hollow locking member disposed within the radial vent apertures of the creepage, the spring, and the amortisseur for preventing axial migration of the spring.

SUMMARY OF INVENTION

Briefly described, aspects of the present invention relate to a generator stator, an assembly and a method for preventing an axial migration of a spring in a generator rotor.

According to an aspect, a generator stator is presented. The generator rotor comprises a rotor body extending axially. The generator rotor comprises a plurality of slots extending longitudinally along the rotor body and disposed at a radial depth in a periphery of the rotor body. The generator rotor comprises a retaining ring disposed at an axial end of the rotor body enclosing an axial end portion of the rotor body. The generator rotor comprises a plurality of components disposed in each of the slots. The components comprise rotor windings disposed on top of a sub slot. The rotor windings comprise a plurality of radial vent apertures. A creepage is disposed on top of the rotor windings. The creepage comprises a plurality of radial vent apertures. A spring is disposed above the creepage with a slot clearance therebetween. The spring comprises a plurality of radial vent apertures. An amortisseur is disposed on top of the spring. The amortisseur comprises a plurality of radial vent apertures. A wedge is disposed on top of the amortisseur. The wedge comprises a plurality of radial vent apertures. A step pin is radially disposed through the amortisseur and inserted into the spring. The plurality of radial vent apertures of each of the components are axially aligned to each other to form a plurality of radial vent passages. The step pin is arranged axially apart from an adjacent radial vent passage. The step pin radially extends through the spring into the slot clearance between the spring and the creepage.

According to an aspect, an assembly for preventing an axial migration of a spring in a generator rotor is presented. The generator rotor comprises a rotor body and a plurality of slots extending longitudinally along the rotor body and disposed at a radial depth in a periphery of the rotor body. A plurality of components is disposed in each of the slots comprising rotor windings, a creepage, the spring, an amortisseur, and a wedge. Each of the components comprises a plurality of radial vent apertures axially aligned to form radial vent passages. The assembly comprises a step pin radially disposed through the amortisseur and inserted into the spring. The step pin is arranged axially apart from an adjacent radial vent passage. The step pin radially extends through the spring into the slot clearance between the spring and the creepage.

According to an aspect, a method for preventing an axial migration of a spring in a generator rotor is presented. The generator rotor comprises a rotor body and a plurality of slots extending longitudinally along the rotor body and disposed at a radial depth in a periphery of the rotor body. A plurality of components are disposed in each of the slots comprising rotor windings, a creepage, the spring, an amortisseur, and a wedge. Each of the components comprises a plurality of radial vent apertures axially aligned to form radial vent passages. The method comprises radially disposing a step pin through the amortisseur and inserting into the spring. The step pin is arranged axially apart from an adjacent radial vent passage. The step pin radially extends through the spring into the slot clearance between the spring and the creepage.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings.

DETAILED DESCRIPTION OF INVENTION

A detailed description related to aspects of the present invention is described hereafter with respect to the accompanying figures.

Figure 1:
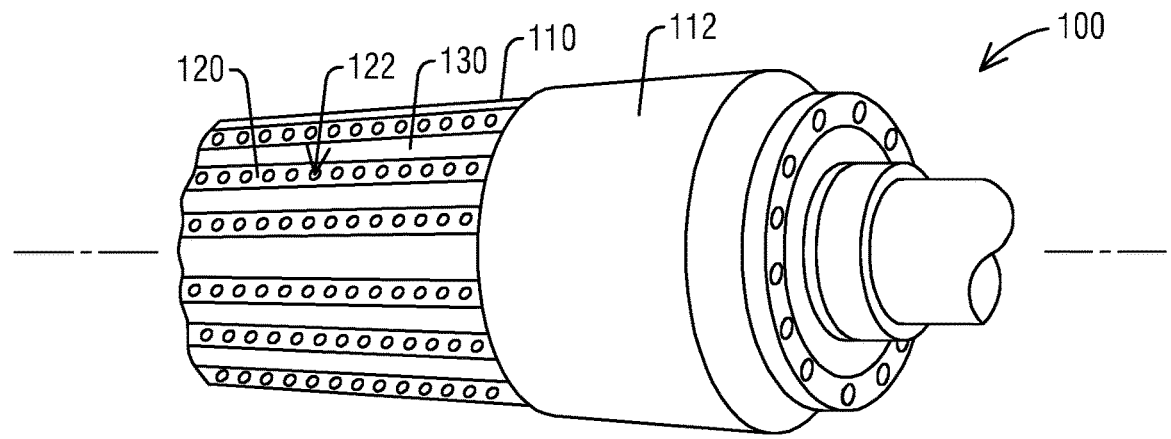
FIG. 1 illustrates a schematic perspective partial view of a generator rotor in which an embodiment of the invention may be incorporated.

FIG. 1 illustrates a schematic perspective partial view of a generator rotor 100 in which embodiment of the invention may be incorporated. The rotor 100 has a rotor body 110 extending from one axial end to an opposite axial end. A plurality of rotor slots 120 extend longitudinally along the rotor body 110. The rotor slots 120 are disposed at a radial depth in the periphery of the rotor body 110 and circumferentially spaced apart from each other by rotor teeth 130. A retaining ring 112 is disposed at each axial end of the rotor body 110 enclosing the axial end portion of the rotor body 110. The rotor 100 needs to be cooled by a coolant during operation. A plurality of radial vent passages 122 are arranged longitudinally along each of the slots 120 for venting the coolant out of the slots 120.

Figure 2:
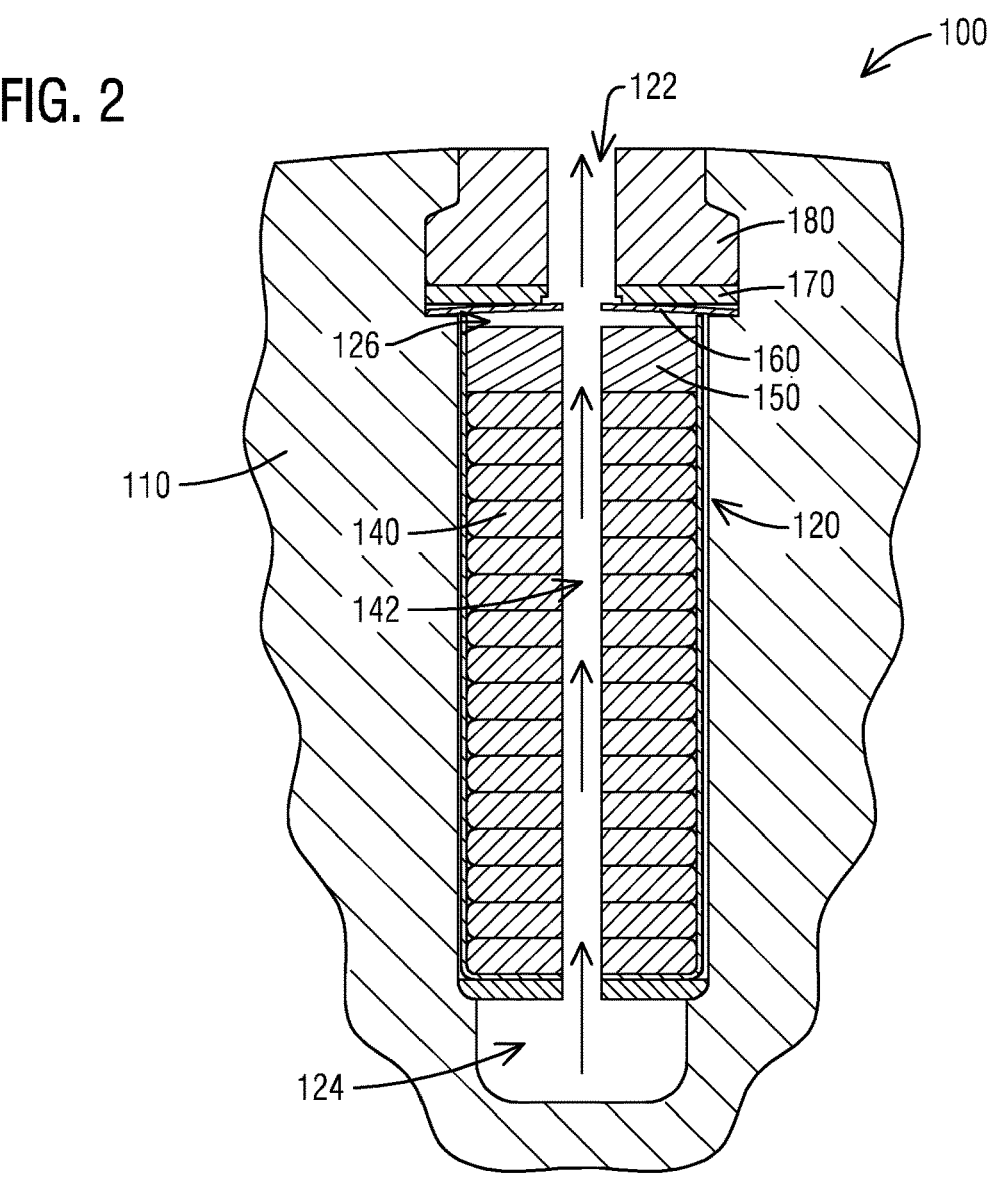
FIG. 2 illustrates a schematic cross section view of a generator rotor in which an embodiment of the invention may be incorporated.

FIG. 2 illustrates a schematic cross section view of the generator rotor 100 shown in FIG. 1, sectioned through one radial vent passage 122. As shown in FIG. 2, the slot 120 has a sub slot 124 that is arranged radially inwardly. Rotor windings 140 are disposed on top of the sub slot 124. A creepage 150 is disposed on top of the rotor windings 140. A spring 160 is disposed above the creepage 150 with a slot clearance 126 therebetween. The slot clearance 126 may allow a radial movement of the rotor windings 140 and the creepage 150 in the slot 120 during operation. An amortisseur 170 is disposed on top of the spring 160. A wedge 180 is disposed on top of the amortisseur 170. The wedge 180 has a dovetail shape and is wedged into the slot 120 to maintain the rotor windings 140, the creepage 150, the spring 160 and the amortisseur 170 in the slot 120. Each of these components has a plurality of radial vent apertures, for example, winding radial vent aperture 142, creepage radial vent aperture 152, spring radial vent aperture 162, amortisseur radial vent aperture 172, and wedge radial vent aperture 182. The radial vent apertures 142, 152, 162, 172, and 182 are radially aligned to each other to form a radial vent passage 122. During operation, coolant flows axially into the sub slot 124 for cooling the rotor windings 140. The coolant radially exits the slot 120 through the radial vent passage 122. However, the spring 170 may migrate in an axial direction during operation. The migration of the spring 170 may result in the spring radial vent aperture 172 misaligned with other radial vent apertures. The misalignment may block the radial vent passage 122. The blockage of radial vent passage 122 may lead to issues of generator operation.

Figure 3:
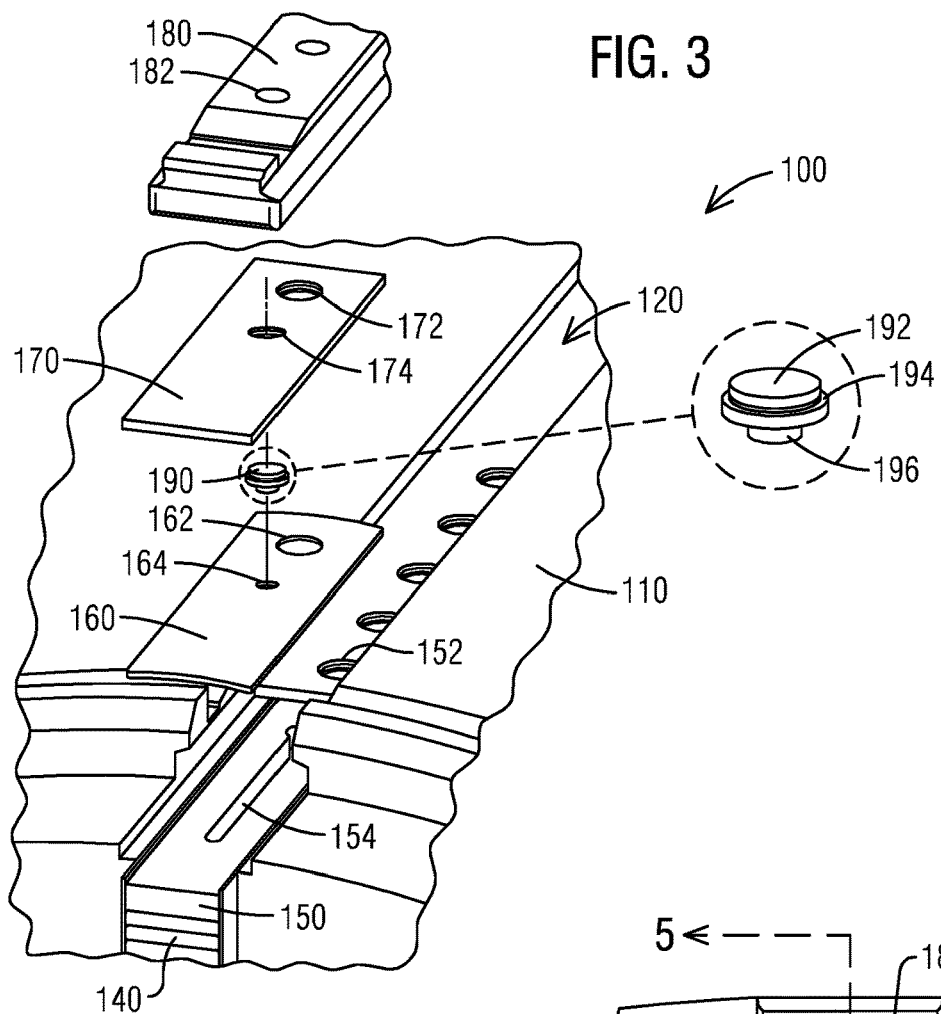
FIG. 3 illustrates a schematic exploded partial view of an end portion of a generator rotor according to an embodiment of the invention.
Figure 4:
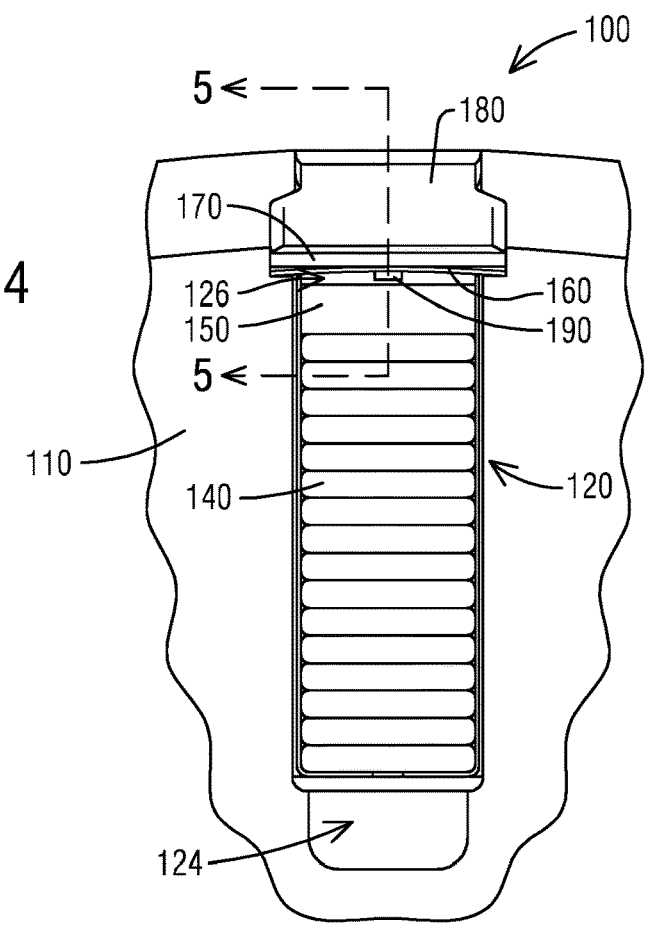
FIG. 4 illustrates a schematic partial end view of a generator rotor according to an embodiment of the invention.

FIG. 3 illustrates a schematic exploded partial view of an end portion of a generator rotor 100 according to an exemplary embodiment of the invention. FIG. 4 illustrates a schematic partial end view of the generator rotor 100 shown in FIG. 3. Retaining ring 112 is removed in FIG. 3 and FIG. 4 for clarification.

With reference to FIG. 3, at least one step pin 190 is radially disposed through an amortisseur 170 and inserted into a spring 160. The step pin 190 is disposed at an axial location that is apart from an adjacent radial vent passage 122. The step pin 190 prevents an axial migration of the spring 160. An enlarged view of the step pin 190 is illustrated in FIG. 3. The step pin 190 includes a pin head 192, a pin shoulder 194 and a pin body 196. Diameter of the pin head 192 is smaller than diameter of the pin shoulder 194. Diameter of the pin head 192 is larger than diameter of the pin body 196. The amortisseur 170 has a counter bore 174 to retain the pin head 192 and the pin shoulder 194. Dimension of the counter bore 174 corresponds to dimensions of the pin head 192 and the pin shoulder 194 such that the pin head 192 and the pin shoulder 194 are tightly disposed through the amortisseur 170. Attachment means may be used to fix the pin head 192 and the pin shoulder 194 in the counter bore 174, such as glue. Diameter of the counter bore 174 for retaining the pin shoulder 194 is smaller than diameter of the amortisseur radial vent aperture 172. The spring 160 has a pin hole 164 for the pin body 196 extending through. Dimension of the pin hole 164 corresponds to dimension of the pin body 196 such that the pin body 196 is tightly inserted through the spring 160. Diameter of the pin body is smaller than diameter of the spring radial vent aperture 162. The counter bore 174 and the pin hole 164 may be manufactured by drilling or any type of manufacturing means. The creepage 150 may have a coolant flow channel 154 extending axially. The amortisseur counter bore 174, the spring pin hole 164 and the step pin 190 disposed through the amortisseur counter bore 174 and the spring pin hole 164 may be circumferentially aligned with the coolant flow channel 154. With reference to FIG. 4, the step pin 190 is disposed through the amortisseur 170 and the spring 160 radially extending into the slot clearance 126 between the spring 160 and the creepage 150. The step pin 190 may be made from materials which are strong enough with a less tendency to shear or break due to axial migration of the spring 160. For example, the step pin 190 may be made from aluminum or steel.

Figure 5:
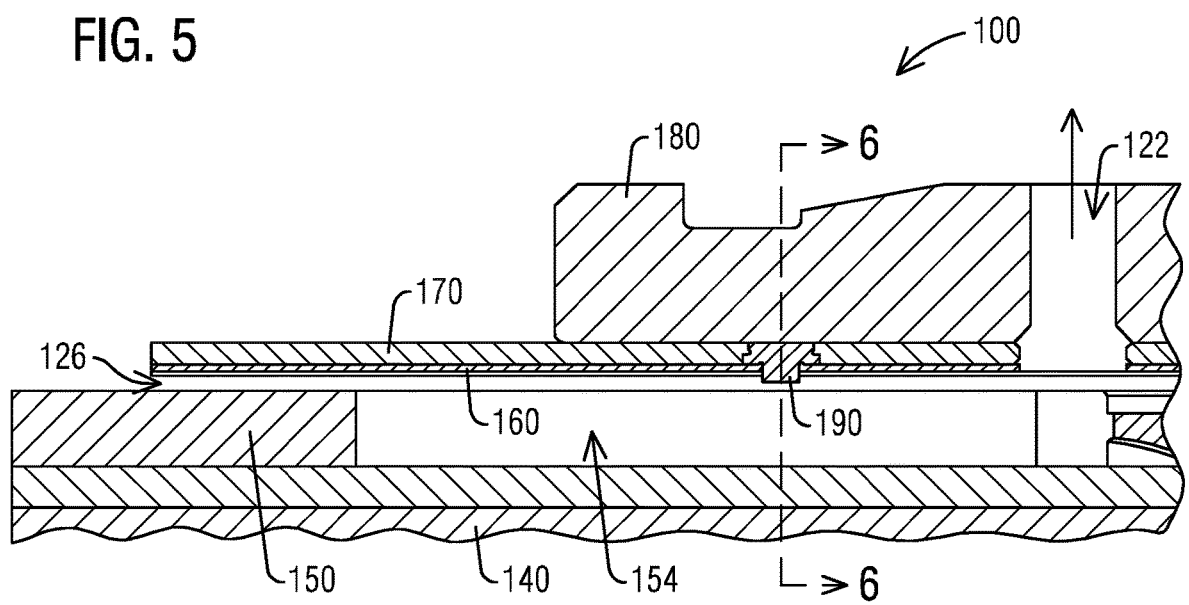
FIG. 5 illustrates a schematic partial longitudinal cross section view of an end portion of a generator rotor according to an embodiment of the invention.
Figure 6:
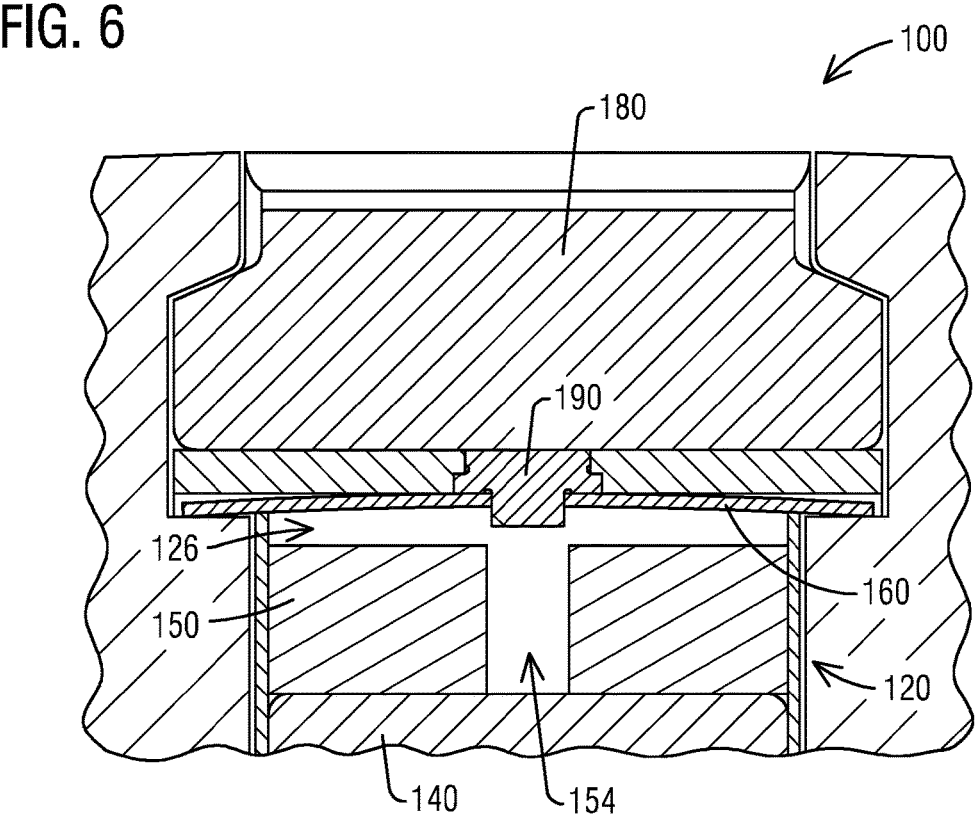
FIG. 6 illustrates a schematic partial radial cross section view of a generator rotor according to an embodiment of the invention.

FIG. 5 illustrates a schematic partial longitudinal cross section view of the generator rotor 100 shown in FIG. 3, sectioned through section line 5-5 of FIG. 4. FIG. 6 illustrates a schematic partial radial cross section view of the generator rotor 100 shown in FIG. 3, sectioned through section line 6-6 of FIG. 5, which is sectioned through the step pin 190.

Referring to FIG. 5 and FIG. 6, a total length of the pin head 192 and the pin shoulder 194 is equal or shorter than a thickness of the amortisseur 170. The pin head 192 is disposed into the amortisseur 170 in a way such that the top surface of the amortisseur 170 is flat for attaching the wedge 180. Length of the pin body 196 may be longer than a thickness of the spring 160 so that the pin body 196 may insert through the spring pin hole 164 and extend into the slot clearance 126 between the spring 160 and the creepage 150. Design and assembly of the step pin 190, the counter bore 174 and the spring pin hole 164 may prevent dislodgement or similar issues due to radial float in the slot 120.

As illustrated in FIG. 6, the step pin 190 is circumferentially aligned with the coolant flow channel 154 disposed on the creepage 150. Diameter of the pin body 196 may be equal or smaller than a width of the coolant flow channel 154. The step pin 190 does not engage with the creepage 150. The step pin 190 does not contact the creepage 150 when the rotor windings 140 and the creepage 150 radially move within the slot clearance 126. Such arrangement prevents failure of the step pin 190 when the rotor windings 140 and the creepage 150 radially move within the slot clearance 126 during startup in turning gear operation.

FIGS. 3 to 6 illustrate one axial end of a rotor body 110 of the generator rotor 100. For illustration purpose, only one spring 160 that is disposed at the axial end is shown in FIG. 3. A plurality of springs 160 may be disposed end to end in the slot 120 from one axial end to the opposite axial end of the rotor body 110. At least one step pin 190 may be radially disposed through the amortisseur 170 and inserted into each of the springs 160 or some of the springs 160. The step pin 190 is arranged axially apart from an adjacent vent passage 122.

During generator operation, the spring 170 may migrate outwardly axially in the slot 120. According to an embodiment, one step pin 190 may be arranged axially outwardly from the first radial vent passage 122 at one axial end of the rotor body 110. A counter bore 174 and a pin hole 164 are arranged axially outwardly from the first spring radial vent aperture 162 and the first amortisseur radial vent aperture 172 to retain the step pin 190. Similar configuration may be arranged at the opposite axial end of the rotor body 110. The assembly of the step pin 190, the counter bore 174 of the amortisseur 170 and the pin hole 164 of the spring 160 prevents the spring 160 migrate outwardly axially in the slot 120 due to heating and cooling cycles or other causes during operation. According to another embodiment, multiple step pins 190 and corresponding counter bores 174 and pin holes 164 to retain the step pins 190 may be arranged in each spring 190.

According to an aspect, the proposed assembly and method present a simple and easy modification of the generator rotor 100 by using a step pin 190 to prevent migration of the spring 170. The proposed modification simply requires drilling a small pin hole 164 in the spring 160 and drilling a small counter bore 174 in the amortisseur 170 to retain the step pin 190. The step pin 190 does not engage with the creepage 150 in the rotor slot 120. The step pin 190 does not engage with the radial vent passage 122. Such arrangement of the step pin 190 prevents failure of the step pin 190 when the rotor windings 140 and the creepage 150 radially move within the slot clearance 126 during startup in turning gear operation.

According to an aspect, the proposed assembly and design of the step pin 190, the pin hole 164 and the counter bore 174 prevent potential dislodgement of the step pin 190 due to the radial float in the slot 120.

According to an aspect, the proposed design of the step pin 190 may be manufactured out of materials including metal, such as aluminum or steel. The proposed design of the step pin 190 is thus stronger and more durable and has a less risk to shear or break due to axial migration of the spring 160.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator Rotor
110: Rotor Body
112: Retaining Ring
120: Rotor Slot
122: Slot Vent Passage
124: Sub Slot
126: Slot Clearance
130: Rotor Teeth
140: Rotor Windings
142: Winding Radial Vent Aperture
150: Creepage
152: Creepage Radial Vent Aperture
154: Creepage Coolant Flow Channel
160: Spring
162: Spring Radial Vent Aperture
164: Spring Pin Hole
170: Amortisseur
172: Amortisseur Radial Vent Aperture
174: Amortisseur Pin Bore
180: Wedge
182: Wedge Radial Vent Aperture
190: Step Pin
192: Step Pin Head
194: Step Pin Shoulder
196: Step Pin Body What claimed is:
1. A generator rotor comprising:
a rotor body extending axially;
a plurality of slots extending longitudinally along the rotor body and disposed at a radial depth in a periphery of the rotor body;
a retaining ring disposed at an axial end of the rotor body enclosing an axial end portion of the rotor body; and
a plurality of components disposed in each of the slots, the components comprising:
rotor windings disposed on top of a sub slot, the rotor windings comprising a plurality of winding radial vent apertures,
a creepage disposed on top of the rotor windings, the creepage comprising a plurality of creepage radial vent apertures,
a spring disposed above the creepage with a slot clearance therebetween, the spring comprising a plurality of spring radial vent apertures,
an amortisseur disposed on top of the spring, the amortisseur comprising a plurality of amortisseur radial vent apertures,
a wedge disposed on top of the amortisseur, the wedge comprising a plurality of wedge radial vent apertures, and
a step pin radially disposed through the amortisseur and inserted into the spring,
wherein the plurality of radial vent apertures of each of the components are axially aligned to form a plurality of radial vent passages,
wherein the step pin is arranged axially apart from the radial vent passages, the step pin comprising a pin head, a pin body and a pin shoulder,
wherein the diameter of the pin head is smaller than the diameter of the pin shoulder, wherein the step pin radially extends through the spring into the slot clearance between the spring and the creepage, wherein the amortisseur comprises a counter bore to retain the pin head and the pin shoulder, and wherein a diameter of the counter bore for retaining the pin shoulder is smaller than a diameter of the amortisseur radial vent aperture.

2. The generator rotor as claimed in claim 1, wherein a total length of the pin head and the pin shoulder is equal or shorter than a thickness of the amortisseur.

3. The generator rotor as claimed in claim 1, wherein the spring comprises a pin hole for the pin body to extend through, and wherein a diameter of the pin hole is smaller than a diameter of the spring radial vent aperture.

4. The generator rotor as claimed in claim 1, wherein the creepage comprises a coolant flow channel extending axially, and wherein the step pin is circumferentially aligned with the coolant flow channel.

5. The generator rotor as claimed in claim 4, wherein the diameter of the pin body is equal or smaller than the width of the coolant flow channel.

6. The generator rotor as claimed in claim 1, wherein the step pin is arranged axially outwardly from a first one of the radial vent passages, at the axial end of the rotor body.

7. A method for preventing an axial migration of a spring in a generator rotor according to claim 1, the method comprising:

inserting the step pin through the amortisseur; and inserting the step pin into the spring, wherein the step pin is arranged axially apart from an adjacent radial vent passage, and wherein the step pin radially extends through the spring into a slot clearance between the spring and the creepage.

8. The method as claimed in claim 7, comprising:

drilling the counter bore to retain the pin head and the pin shoulder; and drilling the pin hole for the pin body extending therethrough.

* * * * *